Jan. 11, 1949.  G. REGET  2,458,733
POSITIVE BRAKE OR ARRESTING MEANS
Filed Oct. 31, 1945
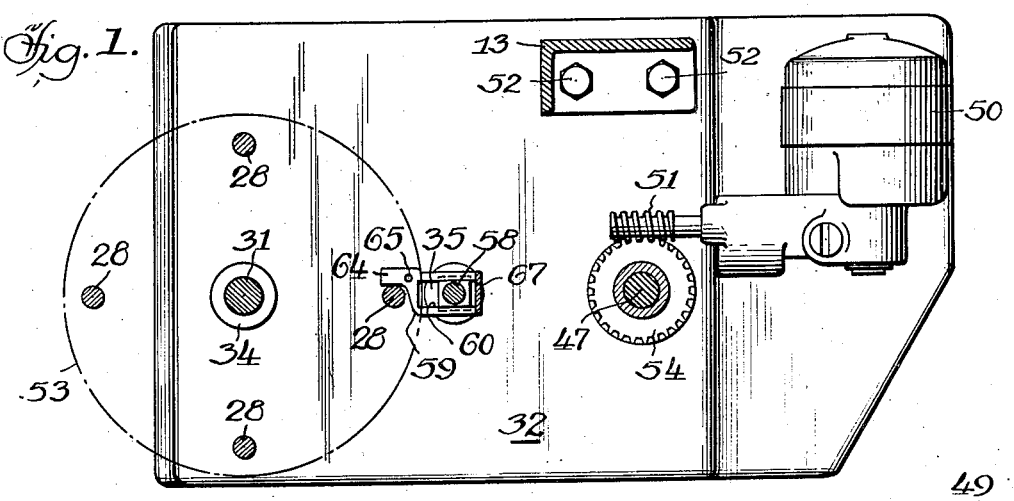
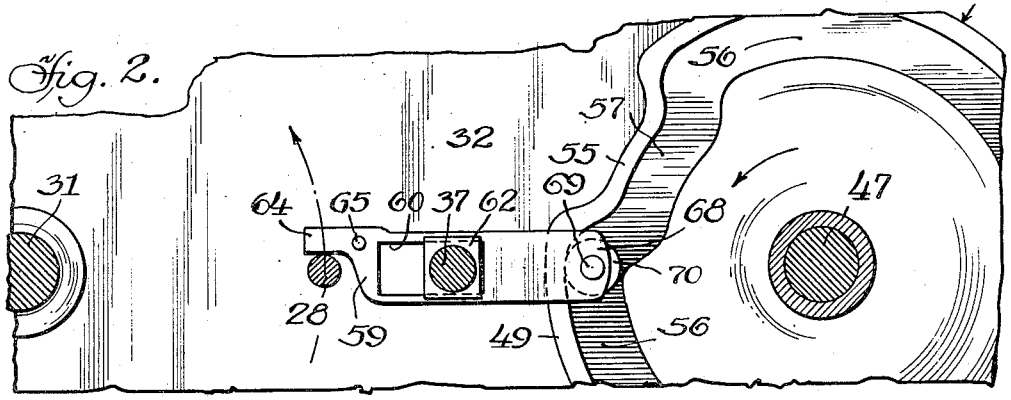
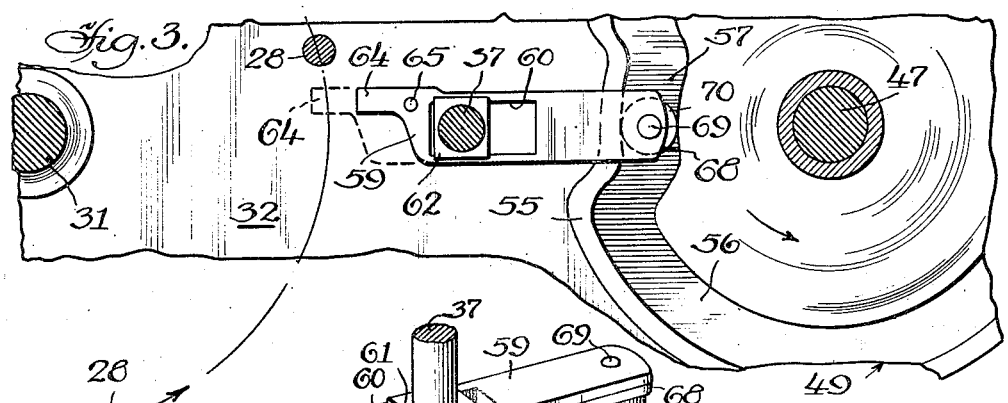
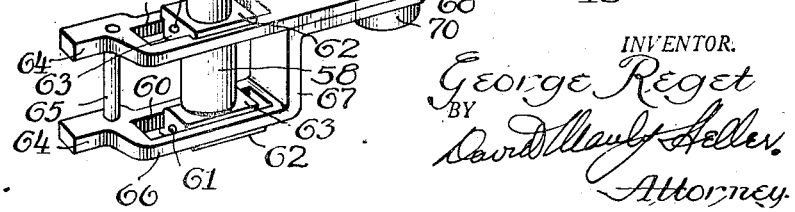
INVENTOR.
George Reget
BY
David Meuly Heller
Attorney Patented Jan. 11, 1949

2,458,733

UNITED STATES PATENT OFFICE 2,458,733

POSITIVE BRAKE OR ARRESTING MEANS

George Reget, New Rochelle, N. Y.

Application October 31, 1945, Serial No. 625,709

1 Claim. (Cl. 188—69)

My invention relates to arresting mechanism used in automatic machines having an intermittently rotating member to furnish positive limitation to the movement of the said rotating member, nullifying any residual momentum imparted thereto.

A further object of my invention is to provide a mechanism which is simple in construction, practical and efficient for the purposes for which it may be used, and one which may be readily and cheaply assembled, yet of such elemental construction as to warrant economical production thereof in quantity manufacture.

Other features, objects, and ancillary advantages to be derived from my invention will become readily apparent from the disclosure embraced in the accompanying drawings, taking into consideration the elucidation in the description hereinafter ensuing, wherein like numerals, or symbols, are used to designate like parts, and in which;

Fig. 1 is a cross-sectional view showing a prime mover, worm gear drive, and my invention, namely, the arresting means.

Fig. 2 is an enlarged view depicting the arresting means in operative or extended position.

Fig. 3 is a view similar to Fig. 2 showing the cam structure advanced to the position where the arresting means or stop is retracted, permitting the rotating member to be advanced so as to locate in proper alignment the succeeding shaft unit, bringing it in the desired position.

Fig. 4 is a perspective view of the specific or detailed structure embraced in the arresting or stop means utilized, depicting important features of my invention.

Referring to the various views, my invention comprises a base 32, an upright bracket 13 supported thereon and secured thereto by fastenings 52 for supporting other elements of a machine not shown. Shaft units 28 are supported in place in proper confinement by means of a rotating member 53. The said rotating member 53 is mounted on a main shaft 31 which is supported in the hub 34 of the base 32.

A drive shaft 47 has secured thereto a worm wheel 54 (see Fig. 1), the said worm wheel being engaged by a worm 51 secured to the motor 50, thus tending to operate continuously at rather slow speed the shaft 47. Intermediate drive or transmission means (not shown) is employed to drive the rotating member 53. The arresting unit, illustrated in detail in Fig. 4, is actuated to afford a permanent and positive stop for the shaft 28. The arresting means is actuated by a track cam, generally designated 49 (see Figs. 2 and 3).

The cam 49 is provided with a concentric raceway 56, having a dwell portion 57, the raceway or the outer periphery of the cam being provided with a lip 55 which is configurative with the raceway and which tends to confine the roller 70 mounted rotatively on the arresting means which is constructed of a number of elemental details. The arresting means is mounted on the shaft 37, which has an enlarged portion 58 so as to act as an abutment for the slide elements 62, which have reduced slide portions 63 and which are securely attached to the shaft 37 by means of pins 61. The shaft 37 is supported by the hub 35.

The said slides 62 are operatively or slidably confined within the rectangular opening 60 in the elements 59 and 66, the element 59 being a flat steel strap element connected to the element 66 by a pin 65 on one end, and provided with an extension portion 64 in each end so as to act as a suitable and positive stop for holding each shaft 28 whenever the arresting means is in the position indicated in Fig. 8, and allowing the same to pass in a counter-clockwise direction, when the arresting means is caused to be retracted by the dwell 57 in the cam 49, as illustrated in Fig. 3.

The roller 70 is mounted by virtue of pin 69, which simultaneously effectuates holding of the end 68 of the element 66 in secure assemblage with the end of the element 59. The element 66 has a bent portion 67 so as to provide a space between the arresting points or projections 64 to offer an effective stop means to counteract the momentum inherent in a shaft 28 during the period of intermittent rotational movement imparted thereto.

The operation of the mechanism is as follows: the motor is started, thus rotating the worm gear 54, which, in turn, rotates the shaft 47 continually, which tends to rotate the cam 49. While the cam is rotating, as shown in Fig. 2, the trackage 56 causes the arresting means to assume an extended position, as shown in Fig. 2, and thus engages the unit shaft 28, preventing further movement of the rotating member 53. When the arresting operation has been completed, then the dwell 57 in the cam approaches the roller 70 as shown in Fig. 2, continuing the movement when the result of Fig. 3 occurs, whereby the arresting means is retracted, permitting the shaft 31 to rotate in a counter-clockwise direction to bring the succeeding shaft 28 into proper alignment.

The dwell being active for but a short period of time, instantly releases or advances the arresting means to be timely receptive to function against the free end of the succeeding shaft 28, and arrest it by virtue of portions 64 thereof. The quadrant of a cycle having been completed, the remaining quadrants are similarly operated or actuated, completing the entire cycle of operation.

Although I have herein described, rather succinctly, the construction and operation of my invention, and since it is susceptible of modification and improvement, I reserve the right to any and all modifications and improvements coming within the scope and spirit of my invention, also such modifications as are impliedly suggested or embraced in the accompanying drawings, as well as those improvements falling within the purview of the foregoing description.

Having thus described and revealed my invention, what I claim as novel and desire to secure by Letters Patent, is:

In a machine of the character described having a rotating member, arresting means comprising, cam actuated intermittent arresting means slidably mounted and provided with roller means; a cam having a raceway and being rotatably mounted engaging the said roller means in its raceway, the said intermittent arresting means provided with bifurcated arresting extensions positioned and arranged to arrest releasably the movement of the rotating member of said machine, the said arresting extensions being provided with elongated slotted portions, and rigidly fixed parallel slide means provided with reduced slide extensions fitted in the said slotted portions.

GEORGE REGET.

REFERENCES CITED

The following references are of record in the file of this patent:

UNITED STATES PATENTS

| Number | Name | Date |
|---|---|---|
| 1,753,549 | Cates | Apr. 8, 1930 |
| 1,937,326 | Pick | Nov. 28, 1933 |
| 2,203,572 | Johnson | June 4, 1940 |
| 2,323,415 | Overbury | July 6, 1943 |
| 2,342,375 | Shurley | Feb. 22, 1944 |